Nov. 21, 1944.  S. FOSTER  2,363,125
LIQUID DAMPED TELESCOPIC SHOCK ABSORBER STRUT
Filed Aug. 27, 1943  2 Sheets-Sheet 2

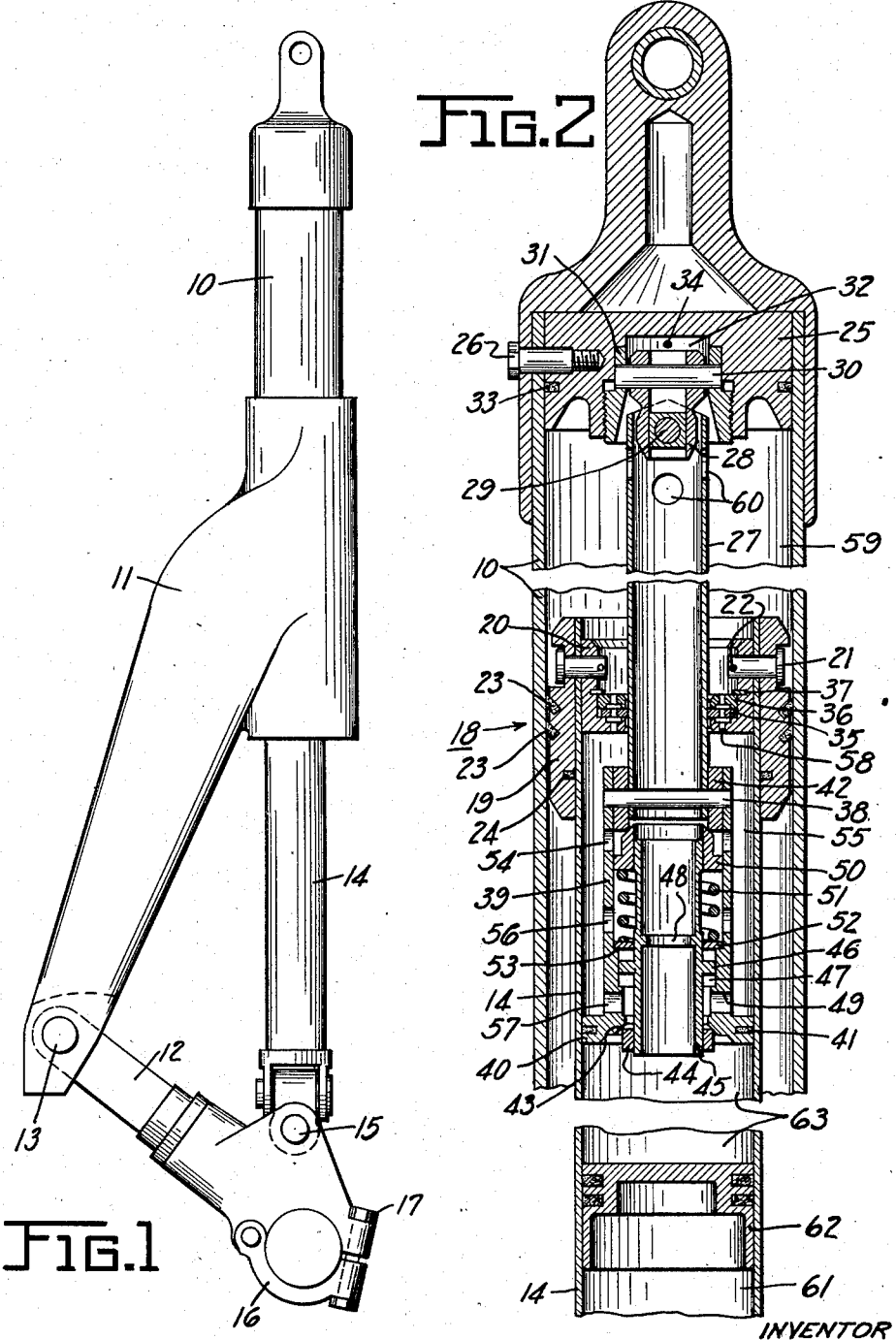

INVENTOR
SIDNEY FOSTER
BY
ATTORNEY

Patented Nov. 21, 1944

2,363,125

UNITED STATES PATENT OFFICE 2,363,125

LIQUID DAMPED TELESCOPIC SHOCK ABSORBER STRUT

Sidney Foster, Leamington Spa, England, assignor to Automotive Products Company Limited, Leamington Spa, England Application August 27, 1943, Serial No. 500,301
In Great Britain June 15, 1942

7 Claims. (Cl. 188—88)

This invention relates to liquid damped telescopic shock absorber struts such as are used on aircraft. It relates to that type of strut which comprises a plunger-and-cylinder unit, the plunger being hollow and containing a resilient element, whilst the cylinder and the part of the plunger not occupied by the resilient element are filled with liquid, the said liquid being transferred from the cylinder to the plunger when the strut is compressed, mainly through a hollow stem attached to the cylinder head and passing through a head on the plunger into the interior of the latter, orifices, valves or other flow restricting means being provided to restrict the flow of liquid and so damp the relative movement of the plunger and cylinder.

The object of the invention is to provide for the automatic reduction of the restriction of liquid flow into the plunger in the event of excessive pressure being applied to the strut, to limit the internal loading to a predetermined maximum.

According to the invention, a main damping orifice is provided by a restriction of the passage through the stem near its end which enters the plunger, and a plurality of ports in the stem adapted to by-pass the restriction are controlled by a resiliently loaded annular valve member subjected to an opening thrust dependent on the pressure drop across the restriction, the valve member exposing said by-pass ports to permit liquid to pass therethrough from the stem into the plunger when the pressure drop across the restriction reaches a predetermined value.

According to another aspect of the invention, compression damping is provided by a restriction of the passage through the stem, ports which lead from the stem into the plunger and provide a by-pass for said restriction being controlled by an annular valve member co-operating with a seating in the stem and subjected to an opening thrust dependent upon the pressure drop across the restriction, the valve member having resilient loading means to oppose said opening thrust.

The annular valve member may comprise a ring having only a portion of its area at one end exposed to the pressure on the cylinder side of the restriction, and the entire area of its other end exposed to the pressure on the plunger side of the restriction. The by-pass ports may be formed in an enlarged portion of the stem, the valve member being substantially L-shaped in radial cross-section, one limb of the L comprising an outward radial flange engaging the internal wall of the enlarged portion of the stem, and the end of the valve member remote from said flange engaging with a seat at the change of diameter of the stem. The valve member may be slidable in the annular space between the enlarged portion of the stem and a sleeve projecting into the stem from the end thereof which enters the plunger to within a short distance of the valve seat, the restriction of the passage through the stem being formed in the sleeve. The restriction of the passage through the stem may be provided by the passage through the annular valve member, and a second restriction may be provided in the stem nearer to its end which enters the plunger, so that the pressure drop between the cylinder and plunger takes place in two stages, and the difference in the pressures applied to the two sides of the valve member is only a part of the total pressure drop.

The invention is hereinafter described with reference to the accompanying drawings, in which:

Figure 1 is a view in elevation of a liquid damped telescopic shock-absorber strut to which the invention may be applied;

Figure 2 is a section through parts of the strut shown in Figure 1, showing one form of the invention incorporated in the strut.

Figure 3:
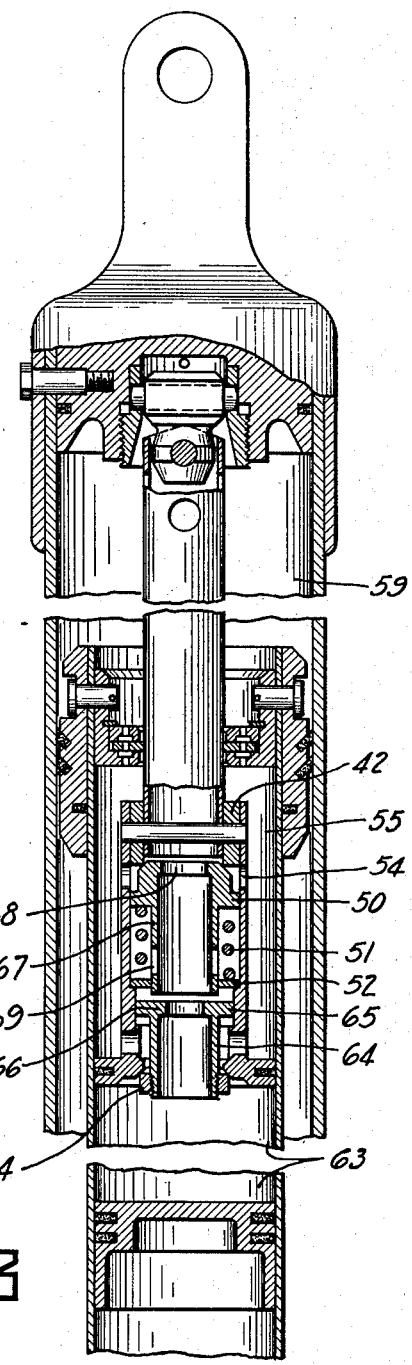
Figure 3 is a section corresponding to Figure 2 and showing a modified form of the invention.

The strut shown in Figure 1 is designed for use in the main undercarriage of an aircraft, each wheel of the undercarriage being mounted between a pair of such struts, and comprises a cylinder 10 on which is mounted a bracket 11, an arm 12 pivotally mounted at 13 on the bracket 11, and a plunger 14 which is pivotally attached to the arm 12 at 15, and which enters the lower end of the cylinder, the plunger having a head (not shown in Figure 1), which is a sliding fit in the cylinder. An axle to carry a wheel is mounted on the arm 12, being clamped in position by a pivoted jaw 16 secured by bolts 17. Vertical movement of the axle with respect to the aircraft causes the plunger to move in the cylinder, the angle of the plunger with respect to the cylinder varying during such movement owing to the swinging of the arm 12 about its pivot.

Referring to Figure 2, the plunger head 18 is mounted on the upper end of the plunger 14, and comprises external and internal parts 19 and 20 secured to the plunger 14 by dowels 21 held in position by split pins 22. The external part 19 of the plunger head is slightly smaller than the interior of the cylinder, to permit it to rock slightly in the cylinder, and it carries sealing rings 23, 23 to provide a fluid-tight joint with the cylinder wall. A further sealing ring 24 prevents leakage of fluid between the plunger 14 and the part 19. The inner part 20 of the plunger head comprises a cup-like member with an apertured base. The upper end of the cylinder 10 is closed by a head 25 held in position by bolts 26, a tubular stem 27 being attached thereto for universal movement by a joint comprising an intermediate member 28 connected to the stem by a pivot pin 29, and to the head by a pivot pin 30 at right angles to the pin 29. The pivot pin 30 has its ends located in a sleeve 31 which surrounds the intermediate member 28 and is screwed into a recess 32 in the cylinder head. A sealing ring 33 prevents leakage of fluid past the cylinder head, and a passage 34 is provided for admitting liquid to the strut, suitable closure means being provided for the passage.

The stem 27 passes through the aperture in the base of the member 20 of the plunger head, the aperture being large enough to allow a certain amount of clearance. A disc 35, which is a sliding fit on the stem, is located between the base of the member 20 and a plate 36 located in the member 20 by a spring ring 37, the disc 35 having an outer diameter such that it is capable of sliding radially in the member 20. The end of the stem 27 which enters the plunger has secured thereto by a pin 38 a sleeve 39 of larger diameter than the stem, on the end of which is formed a piston 40 which is a sliding fit in the plunger, and carries a sealing ring 41. A spacing sleeve 42, held in position by the pin 38, closes the annular gap between the stem 27 and the sleeve 39. The sleeve 39 decreases in internal diameter in three steps toward its end remote from the cylinder head 25, the outer end of the smallest part of the bore being chamfered to form a valve seat 43 upon which engages a non-return valve, the head 44 of which is carried by a tubular stem or sleeve 45 extending into the sleeve 39 to within a short distance of the spacing sleeve 42. The tubular stem 45 has an external flange 46 of a diameter greater than that of the head 44, the flange being a sliding fit in the first reduced portion 47 of the sleeve 39, so that it serves to locate the non-return valve, and an internal flange 48 forming a restriction of the bore. Travel of the valve head away from its seat is limited by the shoulder 49 at the end of the reduced portion 47 of the sleeve 39. Between the sleeve 39 and the tubular stem 45 is mounted an annular valve member 50 of L-shaped cross-section, the axially extending limb of the L having its free end chamfered as shown and engaging with the edge of the spacing sleeve 42 which forms a seat. The outer periphery of the valve member 50 engages with the inner wall of the sleeve 39, in which it is a close sliding fit, whilst internally it is a close sliding fit on the tubular stem 45. The valve member 50 is urged towards its seat by a spring 51 taking its abutment on a ring 52 resting on a shoulder 53 in the sleeve 39. Ports 54 in the sleeve 39 connect the annular space in the sleeve defined by the L-shaped annular valve member to the annular space 55 in the plunger between the head 18 and the piston 40, and the space between the valve member 50 and the ring 52 is connected to the space 55 by ports 56. Additional ports 57 connect the space in the sleeve below the flange 46 to the space 55. Small ports 58 extending through the base of the part 20, the disc 35, and the plate 36 connect the space 55 to the space 59 in the cylinder above the piston. Ports 60 in the upper end of the stem 27, having a total area larger than the passage through the internal flange 40 of the tubular stem 45, connect the space 59 in the cylinder to the interior of the stem 27.

The resilient element of the strut is a volume of compressed air in the lower end of the plunger tube 14, the chamber 61 containing the air being separated from oil filling the remainder of the strut by a floating piston 62. The space in the plunger tube between the floating piston 62 and the piston 40 is indicated by the reference numeral 63.

The strut illustrated in Figure 2 operates in the following manner. Compression of the strut caused by landing of the aircraft, or by the wheel striking a bump on the ground surface whilst taxying, causes the plunger 14 to move upwardly in the cylinder, with the result that liquid is displaced from the space 59. The greater part of this liquid passes through the ports 60, stem 27, and the restriction at 48 into the chamber 63 of the plunger, the restriction at 48 causing a pressure drop which moves the tubular stem 45 downwardly to separate the valve head 44 from the seat 43 and permit liquid to flow into the space 55. No considerable flow takes place through the ports 58 owing to their small size. During the compression stroke of the strut the valve member 50 is subjected, over the small area of its chamfered end within the diameter of the spacing sleeve 42, to the pressure above the restriction at 48, and over the remainder of the area of that end, and the full area of its other end, to the lower pressure on the other side of the restriction, the latter pressure being assisted by the spring 51. The pressure drop across the restriction at 48 depends on the rate of compression of the strut, and if the compression takes place rapidly, the pressure difference across the restriction will build up, and the pressure in the cylinder space 59 will rise rapidly. At a predetermined pressure differential across the restriction at 48 the valve member 50 is lifted off its seat, and liquid is then able to flow past the valve and through the ports 54 into the space 55, thus by-passing the restriction at 48, and relieving the pressure in the cylinder space 59.

As soon as the shock which causes the compression is fully absorbed, and the strut begins to extend, there is a reversal of the pressure difference across the restriction at 48, and the tubular stem 45 is moved upwardly to bring the valve head 44 on to its seat 43. The connection between the spaces 55 and 63 is thus closed, and liquid in the former space can escape only through the ports 58. Extension of the strut is thus controlled by the rate of flow permitted by the ports 58. The balance of pressure acting on the annular valve member 50 is also reversed, and the valve is thus held closed.

Figure 3 shows a modified arrangement in which the single restricting flange 48 is replaced by two restrictions in series, and the pressure drop across the annular valve member is only a part of the total pressure drop between the cylinder space 59 and the space 63 in the plunger. In this arrangement the valve head 44 is provided with a short tubular stem 64 having at its upper end both external and internal flanges 65 and 66 corresponding to the flanges 46 and 48 in the example previously described. The annular valve member 50 has an integral tubular stem 67 extending downwardly through the spring abutment ring 52, and has an internal flange 68 at its upper end to form a restriction of the liquid passage through the stem, in series with the restriction produced by the flange 66. Ports 54 connect the annular space defined by the valve member 50 to the space 55 in the plunger tube as before, but the space between the valve member 50 and the abutment ring 52 for the spring 51 is isolated from the space 55 and is connected by ports 69 to the interior of the stem 67, so that the pressure acting on the underside of the valve member 50 is less than the pressure acting on the part of its upper side within the diameter of the spacing sleeve 42, by only a part of the total pressure drop between the cylinder space 59 and the space 63 in the plunger. It is thus possible to use a lighter spring to obtain opening of the by-pass ports at the same total pressure drop as in the previous example.

In either of the above-described examples, the spring 51 may have a relatively low rate, in which case the annular valve member 50 lifts to a considerable extent as soon as it is moved off its seat, and the pressure in the space 59 does not rise appreciably above that at which the valve opens. Alternatively, the spring may have a relatively high rate, in which case the valve will itself provide some degree of restriction to the flow of liquid when it is open, and the pressure in the cylinder may rise considerably above that at which the valve leaves its seat.

The change in angular position of the plunger with respect to the cylinder of the strut causes the stem 27 to rock slightly at its universal connection to the cylinder head 25, and the intermediate portion of the stem, therefore, moves radially with respect to the plunger head. This movement is accommodated by sliding of the disc 35 between the base of the part 20 and the plate 36.

The invention enable the maximum load in the strut to be kept down to whatever liimt is dictated by the strength of the undercarriage or aircraft structure with which it is used, whilst at the same time providing any desired degree of damping so long as that maximum load is not exceeded.

The invention is more especially useful in connection with landing wheel mountings for aircraft, whether for main wheels or for nose or tail wheels, in which the wheel axle is carried by an arm swinging about a fulcrum on a bracket carried by the shock absorber cylinder, as shown in Figure 1.

In this form of landing wheel mounting a very rapid rise of pressure is likely to be produced in the shock absorber when the wheel strikes a considerable obstruction and has to rise very quickly to surmount it, or is subjected to high drag loads such as are encountered on landing on a concrete runway, due to the need for starting rotation of the wheel.

What I claim is:

1. A liquid damped telescopic shock absorber strut comprising a cylinder, a tubular plunger arranged telescopically in said cylinder and having an annular piston movable therewith in the cylinder, a tube supported on the cylinder and extending through the annular piston into the tubular portion of the plunger, the tube interior being in communication with the interior of the cylinder forward of the plunger piston, said tube having a restriction in the flow of liquid between the cylinder chamber and the interior of the tubular plunger, said tube also being provided with one or more ports adapted to bypass the restriction, a resiliently loaded annular valve member subjected to an opening thrust dependent on the pressure drop across the restriction and controlling said bypass ports to permit liquid to pass through from the tube into the plunger when the pressure drop across the restriction reaches a predetermined value.

2. A liquid damped telescopic shock absorbing strut according to claim 1, wherein the annular valve member comprises a ring having only a portion of its area at one end exposed to the pressure from the cylinder side of the restriction, and the entire area of its other end exposed to the pressure on the plunger side of the restriction.

3. A liquid damped telescopic shock absorbing strut according to claim 1, wherein the tube has an enlarged portion in which the bypass ports are formed, and the annular valve member is substantially L-shaped in radial cross-section, one limb of the L comprising an outward radial flange engaging the internal wall of the large portion of the tube, the end of the valve member remote from said flange engaging with a seat at the change of diameter of the tube.

4. A liquid damped telescopic shock absorbing strut according to claim 1, wherein the tube has an enlarged portion in which the bypass ports are formed and has a sleeve projecting into said tube from the end thereof, and wherein the annular valve member is slidable in an annular space between the enlarged portion of the tube and the sleeve projecting thereinto, the restriction of the passage through the tube being formed in the sleeve.

5. A liquid damped telescopic shock absorbing strut according to claim 1, wherein the tube has an enlarged portion in which the bypass ports are formed and has a sleeve projecting into said tube from the end thereof, and wherein the annular valve member is slidable in an annular space between the enlarged portion of the tube and the sleeve projecting thereinto, the restriction of the passage through the tube being formed in the sleeve, a spring being located in the annular space between the sleeve and the enlarged part of the tube to urge the annular valve member towards its closed position.

6. A liquid damped telescopic shock absorbing strut according to claim 1, wherein the restriction of the passage through the tube is provided at least partially by the annular valve member.

7. A liquid damped telescopic shock absorbing strut according to claim 1, wherein the restriction of the passage through the tube is provided partially by the annular valve member, and partially by the tube near the end which enters the plunger, so that the pressure drop between the cylinder and plunger takes place in two stages, and the difference in the pressure applied to the two sides of the valve member is only a part of the total pressure drop.

SIDNEY FOSTER.